July 14, 1959 W. O. LYTLE 2,894,858
METHOD OF PRODUCING TRANSPARENT ELECTROCONDUCTIVE ARTICLES
Filed Dec. 1, 1950 2 Sheets-Sheet 1

INVENTOR.
WILLIAM O. LYTLE
BY
Olen E. Bee
ATTORNEY.

July 14, 1959 W. O. LYTLE 2,894,858
METHOD OF PRODUCING TRANSPARENT ELECTROCONDUCTIVE ARTICLES
Filed Dec. 1, 1950 2 Sheets-Sheet 2
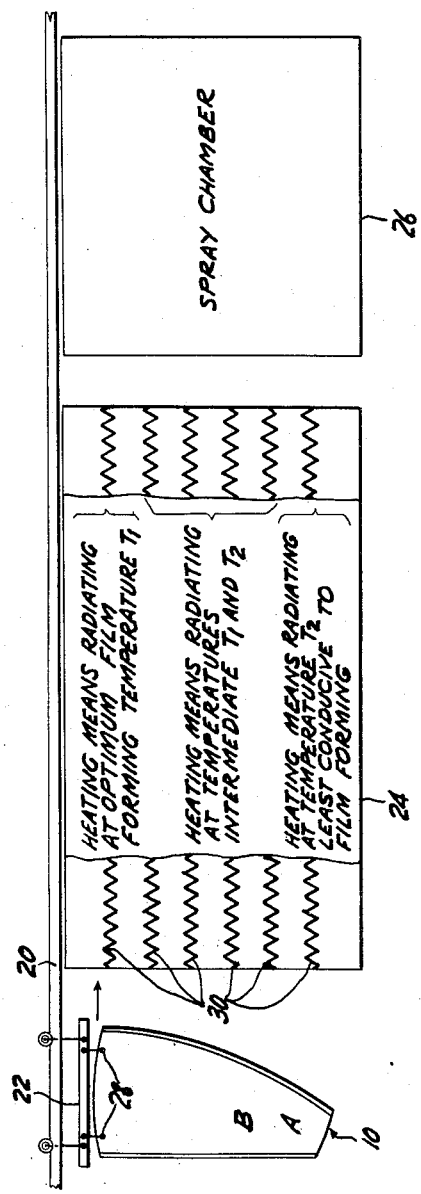
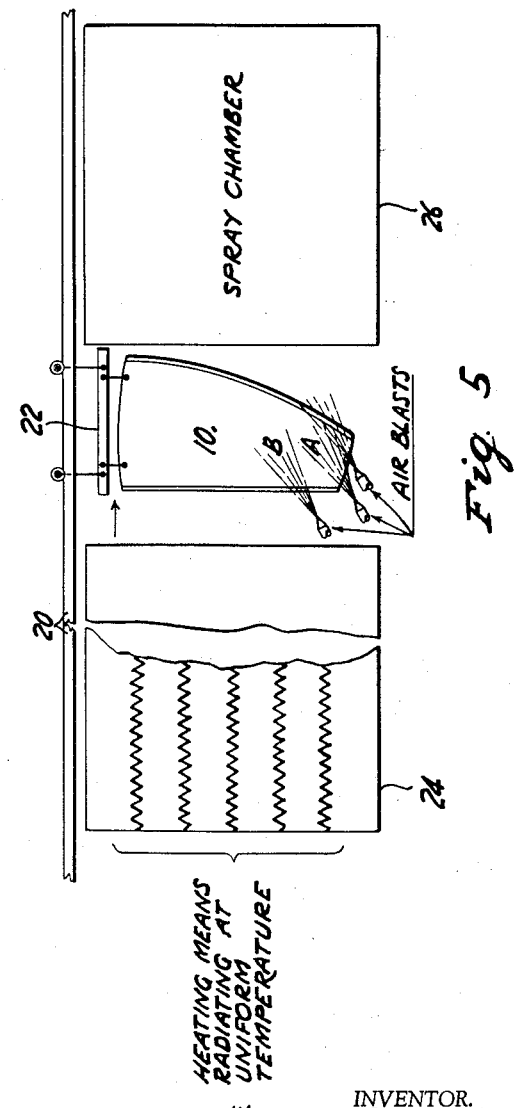
INVENTOR.
WILLIAM O. LYTLE
BY Oscar L. Spencer
ATTORNEY

United States Patent Office 2,894,858
Patented July 14, 1959

2,894,858

METHOD OF PRODUCING TRANSPARENT ELECTROCONDUCTIVE ARTICLES

William O. Lytle, New Kensington, Pa., assignor to Pittsburgh Plate Glass Company, Allegheny County, Pa., a corporation of Pennsylvania Application December 1, 1950, Serial No. 198,673

7 Claims. (Cl. 117—211)

This invention relates to an improved method for depositing electroconductive transparent coatings upon ceramic or refractory viewing closures.

It is known that transparent electroconductive films may be deposited upon glass by applying stannic chloride to the surface of glass heated above 400° F., preferably 850 to 1350° F. Films of superior conductivity may be produced by spraying plate, window or other glass while it is heated to a temperature of above 400° F. but below the temperature at which the glass becomes molten, with tin tetrachloride or other tin or metal salts in aqueous solution or in vapor state, in the presence of a reducing agent such as methanol, phenyl hydrazine hydrochloride, or other agents. The films thus obtained are of unknown composition but appear to contain a preponderant amount, of the order of 97% to 99%, of a tin oxide, and certain impurities which may include metallic tin, carbon, silicon, sodium and chlorine and other impurities, depending upon the composition of the applied tin containing solution.

These films have a thickness of about 50 to 800 millimicrons, are transparent and have the unusual characteristic of being electroconductive, the particular degree of electroconductivity being dependent to a large degree upon the nature of the process of depositing the films. Tin oxide films which are deposited in accordance with the process described above have a surface resistivity below about 500 ohms per unit square and a specific resistance or resistivity below about 0.002 ohm centimeter. Further details respecting the production of these films will be supplied hereinafter.

Although articles having such films are useful in many fields, they have been found to be especially useful as windshields or viewing closures in automobiles, aircraft, trains and similar automotive vehicles. In such use the coating is placed in series with a source of electric potential, and is used as a heating element in order to heat the closure and prevent deposition of ice, fog, etc. thereupon.

In the production of articles which are the subject matter of this invention, a glass sheet, usually of plate glass or other flat glass structure (including bent or curved glass structures), is provided with conducting metal strips suitable for bus bars. It is the general practice to apply these bus bars to the base before the electroconductive oxide coating is applied; however, certain types of bus bars may be applied after the deposition of the electroconductive film. The bus bars are generally located adjacent the edges of the glass (usually within 0.5 inch of the edge) and, in the preferred embodiments, are located on opposed marginal edges. For example, in an essentially rectangular viewing closure such as a windshield, two bus bars are applied on a pair of opposite marginal edges. These metallized strips must be capable of withstanding the temperatures and oxidizing conditions of treatment, and therefore preferably should be of a ceramic character. Furthermore, they should be capable of fusing or otherwise forming an adherent, well-bonded coating to the glass. The strips should adhere firmly to the glass sheet, and should have a conductivity at least 10 to 20 times that of the conductive coating. Generally, the strips are from about 0.05 to 1 inch in width.

In practice it has been found that the most satisfactory compositions for use in preparing the bus bars comprise a highly conductive metal powder (preferably gold or silver) and a vitrifying binder. The ingredients forming the vitrifying binder, for example, litharge, boric acid and silica, are heated to a sufficient temperature, for example 1700° F., to compel them to fuse and form a glass-like mass. This mass is then converted into a frit by grinding, usually in a ball mill. The electroconductive metal, such as pulverulent silver, is then added to this frit and spraying or screening vehicles are added to the compositions to facilitate their application. Some of the vehicles usually employed are French fat oil, turpentine, water and ethyl alcohol.

In order to avoid production of bus bars which will develop in use excessive stresses in the glass, the bus bar preferably should be located on the extreme edge of the glass, and the bus bar thickness should not exceed about 0.005 inch, preferably below about 0.003 inch.

After application of the ceramic metal bus bars to the glass sheet by painting or other method, the sheet is heated to the temperature at which application of the conductive coating may be effected, for example, above about 400 to 800° F. but below the fusion point of the glass, usually 950 to 1150° F. During this heating operation, the ceramic metal coating is fused onto the glass so that a firm bond is established between the glass and the metal coating.

When the glass has been heated as above described for one or two minutes, it is withdrawn from the heating chamber and immediately is sprayed with the coating solution before substantial cooling of the glass sheet can take place. A quantity of the coating solution is placed in an atomizing spray gun and the heated glass sheet is sprayed with an atomized spray of this material for a brief period, usually of the order of 2 to 20 seconds, depending upon the thickness of film to be produced, the air pressure imposed upon the atomizing spray gun, etc. Usually this spraying operation is conducted in oxygen or air of atmospheric humidity. However, conductive coatings have been obtained even when oxygen appears to be essentially absent, although it is probable that oxygen, either from the atmosphere or combined in water or similar compound, is present. This process results in the production of a base coated with a tin oxide electroconductive film.

Articles produced according to the above description, further details of which will be supplied below, are suitable for use as viewing closures or windows. Usually they are laminated with a suitable plastic, such as polyvinyl butyral, to reinforce the glass and provide a so-called "safety glass" construction. These closures may be successfully heated by imposing an electric potential across the bus bars, thus using the conductive film as a resistance element.

In the past, an unduly high number of windshields or like panels of the type herein described have failed in use or test. This failure frequently is manifested by fracture of the glass after an electric potential has been imposed across the bus bars to cause the film to be heated to a suitable temperature (for example 100 to 125° F. or above) for a period of time. Such failure has been discovered to be particularly apt to occur in certain panels having a contour such that the bus bars must be disposed in a non-parallel relationship.

It has been found that one of the causes of such failure is unequal distribution of current flow along one or both of the bus bars. When a panel is provided with non-parallel bus bars, the current flow through uniform specific resistivity films will tend to be highest at the point or points where the bus bars are closest together, and lowest at the point or points where the bus bars are farthest apart. In like manner, when one bus bar of a pair of bus bars (whether parallel or not) is longer than the other, the density of current flow and consequent heat generation tends to be highest at the ends of the shorter bus bar.

A further possibility occurs in the case of a non-rectangular panel having the shape of a parallelogram in which the bus bars are substantially parallel and equal in length. In such a case, the density of current flow and consequent heat generation tends to be highest at the terminus of the bus bar which is perpendicularly across from the opposed bus bar. Consequently, a large amount of current may flow to a bus bar at one point or area along its length and a relatively lower amount of current may flow to the bus bar at another point or area along its length.

It has been found that a substantial reduction in such failures may be accomplished by production of a transparent electroconductive film which has non-uniform surface resistivity, the surface resistivity of the film being greatest in the areas intermediate the bus bars where the bus bars are closest together, and lowest in the areas intermediate the bus bars where the bus bars are farthest apart. Production of such a film results in establishing substantially uniform heat generation throughout the film between the bus bars.

According to this invention, a method of providing a refractory base, such as a glass base, with a metal oxide coating, such as tin oxide, having non-uniform surface resistivity has been discovered. The surface resistivity of the coating produced is varied, preferably to substantially equalize the heat generation throughout the film between the bus bars. In accordance with the invention, this may be accomplished by applying a metal compound, such as stannic chloride, to a non-uniformly heated refractory base, thereby forming a film of non-uniform surface resistivity.

The surface resistivity of the metal oxide film is dependent upon the temperature of film formation, i.e. the temperature of the base at the time of application of the film-forming solution. The surface resistivity variation is a result of at least two factors. When the film is formed at certain temperatures, the specific resistivity of the film formed is lower than when the film is formed at other temperatures. The thickness of the film produced is also dependent upon the temperature of film formation. This variation may also be used to produce resultant variations in surface resistivity. Thus it can be seen that when one portion of the base is heated to one temperature whereas other parts of the base are heated to different temperatures and the base is then sprayed with a metal compound capable of producing a transparent electroconductive film, a film of varying surface resistivity is produced.

The invention may be more particularly described by reference to the application of a solution of 20 percent by weight of methanol and 80 percent by weight of stannic chloride pentahydrate to a plate glass base having a contour such as is shown in Fig. 1 of the drawings in which:

Fig. 4 is a fragmentary longitudinal elevational view illustrating the performance of one embodiment of the method of the present invention;

Figure 5 is a fragmentary longitudinal elevational view illustrating the performance of an alternate embodiment of the present invention.

Figure 1:
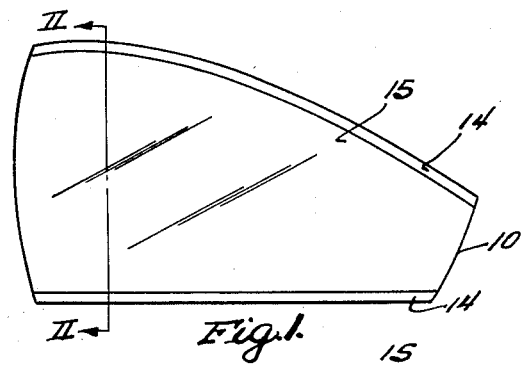
Fig. 1 is a diagrammatic plan view of an irregularly shaped glass panel which is suitable for use as a windshield in airplanes, automobiles or other vehicles, and in which one embodiment of the invention is shown.
Figure 2:
Fig. 2 is a sectional view of the panel of Fig. 1 taken along the line II—II in Fig. 1.

In the drawings, Figs. 1 and 2 diagrammatically illustrate a panel 10 which is produced by practice of the invention. The panel 10 comprises an irregularly shaped glass base 12 having bus bars or conductive marginal edge strips 14 of an electroconductive metal such as gold, silver, copper, etc. along opposed edges and close to the edges (preferably within 0.5 inch of the edge or on the edge) of the sheet. The bus bars may be connected to opposite poles of a source of potential (not shown). The panel 10 is provided with an electroconductive transparent film 15 such as may be produced by spraying or otherwise applying a tin compound or similar compound on the heated panel, as previously described.

Normally, the resistance of such film per unit square (surface resistivity) is substantially constant. That is, while there may be some variation in the thickness and conductivity of these films, the variation is random and, generally speaking, (neglecting minute areas) the average surface resistance (in ohms per unit square) of areas of the film between one pair of opposed bus bar sections will not materially differ from that between another pair of opposed bus bar sections.

When the circuit is closed, electrical current passes through the electroconductive transparent film 15 and heat is generated by virtue of the resistance of the film. As stated above, the current would tend to pass more readily through sections of the electroconductive film where the distance between the bus bars is shortest. Thus, there would result an excess of heat at these areas and a deficiency of heat at points intermediate the bus bars where they are farthest apart. In Fig. 1 such an area of excessive heating would exist in the section of the film between the right-hand termini of the bus bars 14, since the current path would be shortest in this area. However, if the resistance of sections of the film between the bus bars at other areas on the panel is made substantially equal to that of the film at the right-hand side of the panel, then the current would no longer tend to concentrate in the path between the right-hand termini of the bus bars but would flow substantially evenly between the bus bars at all points throughout their length.

As disclosed above, the specific resistivity of the film varies with the temperature at which the film is formed. Thus, a film having a non-uniform resistivity is produced by controlled heating of the base and thereafter applying the metal compound to the non-uniformly heated base. The information disclosed on the graph in Fig. 3 of the drawing is resorted to in order to determine the desirable temperature to which each portion of the base should be heated in order to obtain a film having the desired resistance pattern.

Figure 3:
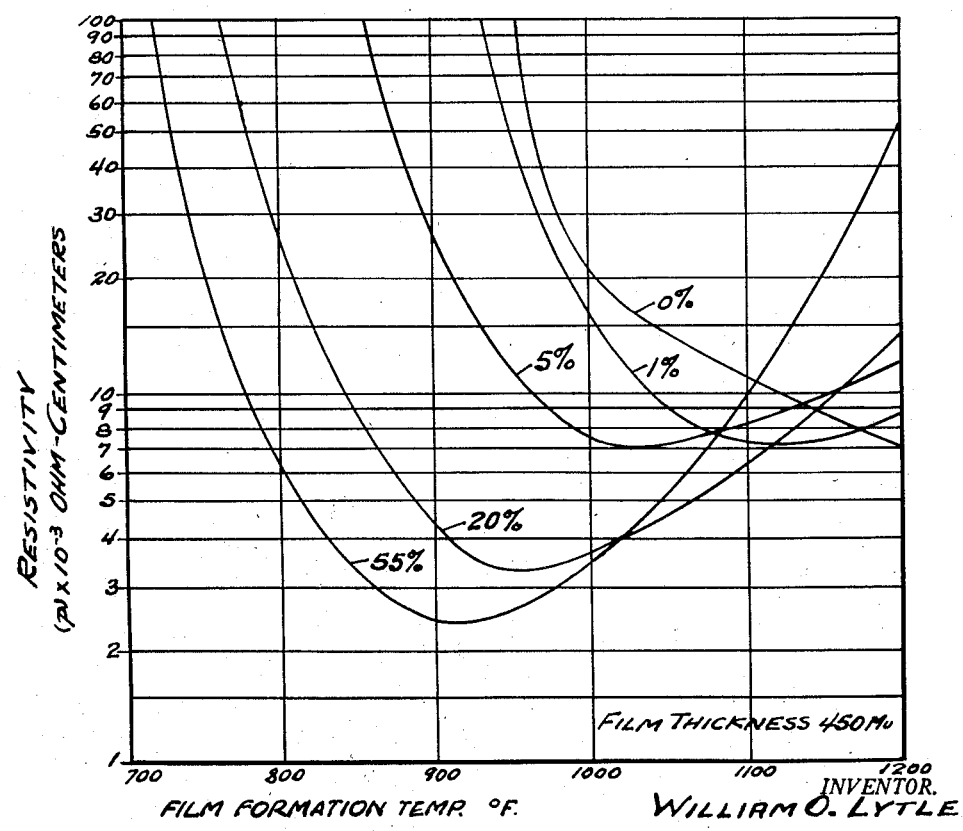
Fig. 3 is a graphical illustration of variations in the resistivity of the electroconductive film, with variations of the film forming temperatures when the film is formed from various solutions of methanol and stannic chloride pentahydrate.

In Fig. 3 the results of tests are graphically set forth showing the variation of the specific resistivity of the film in ohm-centimeters plotted as the ordinate, versus the film formation temperature in degrees F. plotted as abscissa. This data illustrates the effect of the film formation temperature on the specific resistivity of films of uniform thickness (450 millimicrons) and does not take into account the variation in thickness of film formed with the film formation temperature. The spraying solutions employed in these tests consisted of solutions of methanol and stannic chloride pentahydrate, said solutions containing from 0 to 55 percent by weight of methanol. The different curves on the graph represent the variation when different percentages of methanol are employed, namely, 0, 1, 5, 20 and 55 percent.

An example of the invention may be described in conjunction with the application of a 20 percent by weight of methanol solution of the spray. From the graph it can be seen that the optimum film formation temperature, insofar as producing films of maximum electroconductivity is concerned, is within the temperature range of approximately 940–970° F. Such films have a specific resistivity of about $3.3 \times 10^{-3}$ to $3.6 \times 10^{-3}$ ohm-centimeters. The area intermediate the left-hand termini of the panel in Figs. 1 and 2 represents the area wherein the bus bars are farthest apart; therefore, the temperature of the base in this area is preferably established at or near the optimum film formation temperature, as shown on the panel in Fig. 1.

As you proceed along the length of the bus bars from left to right, it can be seen that the distance between opposed portions of the bus bars gradually decreases. Therefore, in order to maintain the heat generation throughout the film between the bus bars as nearly equal as possible, the temperature of the base prior to application of the film is established at different temperatures from left to right, thus forming films of increasing resistivity. The temperature of the base 12 is established at about 890–940° F. or 1040–1050° F. in an area approximately one-third to two-thirds the distance from the left-hand edge of the panel to the right-hand edge of the panel, approximately 850–870° F. or 1100–1300° F. in an area substantially two-thirds of the distance from the left-hand edge of the base to the right-hand edge of the base. The resistivity of the film formed on this latter portion of the base will be of the order of 6 to $8 \times 10^{-3}$ ohm-centimeters.

A further embodiment of the invention involves establishing optimum film formation temperature on the base in areas adjacent the bus bars in order to ensure greater conductivity of the film adjacent the bus bars. These areas are heated to temperatures which form a film of lower resistivity than are the areas of the base intermediate the bus bars.

The invention has been described with respect to spraying solutions of methanol and stannic chloride pentahydrate. The curves represented on the graph in Fig. 3 will vary of course as the ingredients of the spraying solution and their concentrations are changed. The addition of certain ions such as fluoride ions or film forming agents such as phenyl hydrazine will alter the shape and disposition of the curve. In the practice of the invention it is advisable to have data showing graphically the change in resistivity with change in the film formation temperature for the specific spraying solution being employed.

It is to be understood, of course, that it is not absolutely necessary that the base be heated to the optimum film formation temperature in the areas where greater conductivity of the film is desired, but merely that that portion of the base whereon the film is to be of greater electroconductivity be maintained at a temperature which produces an electroconductive film of higher electroconductivity than that which is produced on other portions of the film.

Such a temperature variation prior to application of the metal compound may be established by heating or cooling the desired area immediately after the overall heating of the base and just before or at the same time as the application of the metal compound. The base may be locally heated by blasts of hot gases or a flame, or conversely may be locally cooled by blast of cool air or sprays of water or other suitable liquid. The base may also be heated non-uniformly in a single heating operation by suitable arrangement of gas jets or otherwise employing the heating means so as to heat the base non-uniformly.

Figures 4 and 5 illustrate two typical methods of filming an irregularly shaped glass sheet such as the panel 10 depicted in Figure 1.

An overhead monorail 20 is used to transport carriages 22 through a furnace 24 and a spray chamber 26 in sequence. Each carriage 22 supports tongs 28 which are used in pairs to suspend a glass sheet 10 therefrom. The furnace 24 is in the shape of a tunnel having spaced vertical walls provided with heating elements 30 disposed parallel to the path of movement of the glass sheets through the furnace. The temperature pattern of the glass sheet is determined by the amount of heat radiated onto different increments of the glass sheet passing through the furnace by adjusting the thermal output of each heating element 30 in the embodiment of Figure 4, while in the embodiment of Figure 5, the heating elements 30 may be adjusted to heat the passing glass sheet uniformly to substantially the softening point of the glass, and before the heated glass sheets are subjected to a uniform spraying of film forming composition in the spray chamber 26, preselected portions only, such as area A of narrowest width and area B of intermediate width, may be cooled in different amounts by air blasts dispensed from one or more air guns trained on different regions of the passing glass sheets. For example, area A may be subjected to two cold air blasts and area B to one cold air blast, as shown.

As an alternative to the structure of Figure 5, a battery of air blasts may be provided from a common manifold with the feed pipes to each air blast suitably valved to control or throttle the cooling of different increments of the glass selectively. Also, hot gases may be employed in lieu of cooling air blasts to vary the localized glass temperature of any preselected portion from the optimum temperature for forming a film portion of minimum or intermediate surface conductivity.

The amount of temperature variation created on the surface of the base is dependent upon the variation desired in the surface resistivity of the film. Usually, a temperature change of at least 10° F. is necessary to create any appreciable change in the specific resistivity of the film. The change in temperature from one area to another is preferably gradual in order to prevent creating too abrupt changes in resistivity in the film from one area to another.

It should be understood that the invention herein described is not limited to use for establishment of uniform current distribution, although useful for this purpose. other current distributions may be established, and highly unbalanced current distribution may be accomplished within the ambit of the invention. Moreover, the film may be so formed as to direct maximum current to a central localized area in a panel, if desired.

The invention is particularly applicable for use in connection with a transparent tin oxide film. However, the invention is also applicable in connection with the production of other transparent electroconductive films, particularly metal oxide films. Thus, the films herein contemplated may comprise cadmium oxide, antimony oxide, cobalt oxide, zinc oxide, indium oxide, titanium oxide, chromium oxide, platinum oxide, silicon oxide, thallium oxide, etc., which may be prepared by using the bromide, chloride or acetate of the corresponding metal.

Where viewing closures for vehicles are to be provided, the base for the film normally is ordinary plate or lime-soda glass. Other refractory materals incuding borosilicate glass, china, mica, phosphate glass, porcelain, stone or other refractory composition which melts at temperatures above 1150 to 1350° F. may be provided with electro conductive coatings in the same manner.

Although the present invention has been described with reference to the specific details of certain embodiments thereof, it is not intended that such details shall be regarded as limitations upon the scope of the invention except insofar as included in the accompanying claims.

I claim:
1. In the method of coating a non-rectangular refractory base with a transparent electroconductive coating of non-uniform surface electroconductivity by applying a metal compound to a heated base, the steps which comprise heating the base to a non-uniform temperature above 400° F. but below the temperature at which the base becomes molten by imparting different amounts of heat to different areas of the base so that the temperature of the base in the region of its greatest width is within a desired temperature range relatively close to the temperature at which a metal oxide film of maximum surface electron conductivity is formed from the metal compound applied, and the narrowest portion of the base is within another temperature range relatively separated from the temperature range at which a film of maximum surface electroconductivity is formed, and substantially uniformly applying a metal compound upon said non-uniformly heated base to form an electroconductive metal oxide coating whose surface electroconductivity is greatest across the widest portion of the base and least across the narrowest portion of the base.

2. In the method recited in claim 1, the improvement wherein the metal compound used contains tin.

3. In the method of coating a refractory base provided with non-parallel bus bars with a transparent electroconductive film of non-uniform surface electroconductivity by applying a metal compound to a heated base, the steps which comprise heating the base to a non-uniform temperature above 400° F. but below the temperature at which the base becomes molten by imparting different amounts of heat to different areas of the base so that the temperature of the base in the region where the bus bars are most widely separated is within a desired temperature range relatively close to the temperature at which a metal oxide film of maximum surface electroconductivity is formed from the metal compound applied and the portion of the base wherein the bus bars are most closely spaced is within another temperature range relatively separated from the temperature range at which a film of maximum surface electroconductivity is formed, and substantially uniformly applying a metal compound upon said non-uniformly heated base to form an electroconductive metal oxide film whose surface electroconductivity is greatest in the region of widest separation of the bus bars and least in the region of narrowest separation of the bus bars.

4. A method of providing a transparent electroconductive coating of non-uniform surface electroconductivity upon a base provided with a pair of spaced bus bars comprising heating the base to a non-uniform temperature above 400° F. but below the temperature at which the base becomes molten by imparting different amounts of heat to different areas of the base so that the temperature of the base in the region adjacent the bus bars is within a desired temperature range relatively close to the temperature at which a metal oxide film of maximum surface electroconductivity is formed from an applied metal compound and other portions of the base between the regions adjacent the bus bars are within another temperature range relatively separated from the temperature range at which a film of maximum surface electroconductivity is formed, and uniformly applying a metal compound upon said non-uniformly heated base to form an electroconductive metal oxide coating whose surface electroconductivity is greater in the vicinity of the bus bars than in the other portions.

5. The method of producing an electrically conducting coating upon a surface of a glass sheet of irregular outline, comprising uniformly heating the sheet to substantially the point of softening of the glass, then cooling preselected portions only of the sheet, and finally substantially uniformly applying a coating of tin oxide from a tin halide solution to the surface of said sheet including the cooled areas.

6. The method of producing an electrically conducting coating upon a surface of a glass sheet of irregular outline, comprising uniformly heating the sheet to substantially the point of softening of the glass, then cooling preselected portions only of the sheet by the application of jets of air thereto, and finally substantially uniformly spraying a solution of tin halide to the surface of said sheet including the cooled areas.

7. A method of coating a non-rectangular refractory base with a transparent electroconductive coating of non-uniform surface electroconductivity comprising causing the surface of the base in its region of greatest width to attain a temperature within a desired temperature range relatively close to the temperature at which a metal oxide film of maximum surface electroconductivity is formed by applying a metal compound thereto, causing the surface of the base in its narrowest region to attain a temperature within another temperature range relatively separated from the temperature range attained by the region of greatest width while heating the base to a non-uniform temperature above 400° F. but below the temperature at which the base becomes molten, and while the various regions of the base are at said temperatures within said temperature ranges, substantially uniformly applying a metal compound, capable of forming a metal oxide film upon contacting a heated refractory surface, upon said base to form an electroconductive metal oxide coating whose surface electroconductivity is greatest across the widest region of the base and least across the narrowest region of the base.

References Cited in the file of this patent

UNITED STATES PATENTS

| | | |
|---|---|---|
| 2,061,106 | Schellenger | Nov. 17, 1936 |
| 2,244,715 | Long | June 10, 1941 |
| 2,516,663 | Zunick | July 25, 1950 |
| 2,522,531 | Mochel | Sept. 19, 1950 |
| 2,537,671 | Jack et al. | Jan. 9, 1951 |